Sept. 3, 1957 R. BRAUNE 2,804,904
SURFACE GRIP OR STRAKE DEVICES FOR VEHICLE WHEELS
Filed May 28, 1954
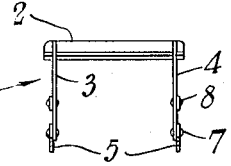
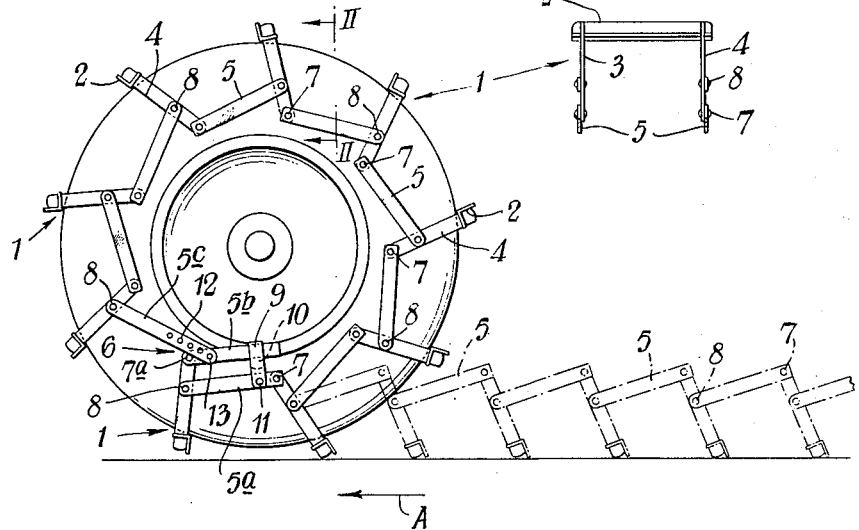
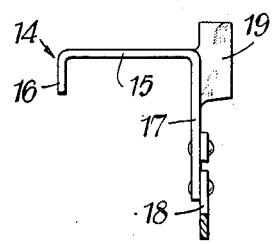
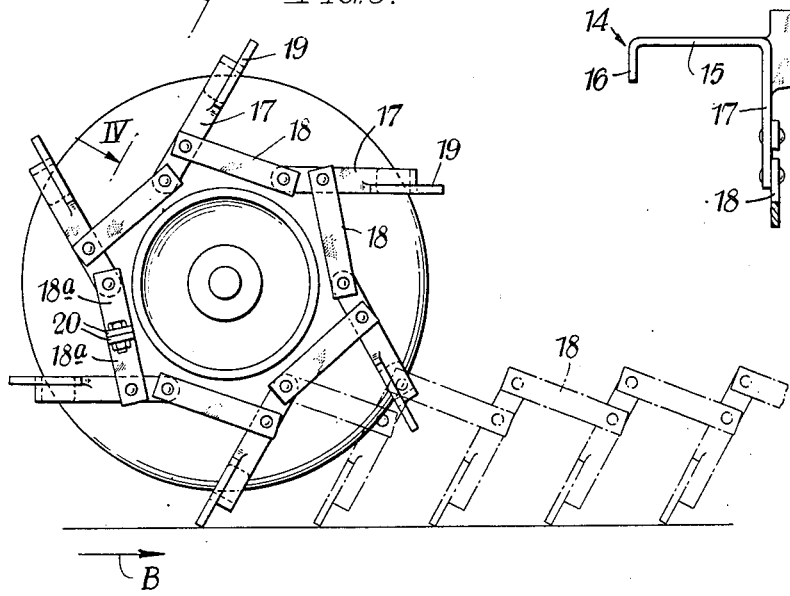

United States Patent Office 2,804,904
Patented Sept. 3, 1957

2,804,904

SURFACE GRIP OR STRAKE DEVICES FOR VEHICLE WHEELS

Rudi Braune, Stroud, England

Application May 28, 1954, Serial No. 433,181

Claims priority, application Great Britain June 4, 1953

6 Claims. (Cl. 152—219)

This invention relates to surface grip or strake devices (herein referred to as "grips") for application to vehicle wheels fitted with pneumatic or other resilient tyres, to prevent or reduce the tendency for the wheels to slip upon soft or slippery surfaces. The invention is concerned more particularly but not exclusively, with grips for attachment to pneumatic-tyred driving wheels of agricultural tractors and other implements.

An object of the invention is to provide a grip for attachment to vehicle wheels fitted with pneumatic or other resilient tyres, said grip comprising a number of grip elements or members each having a cleat or tread part which can extend across the tyre, and side arms adapted to be located on opposite sides of the tyre, links pivotally connected to corresponding arms of said members and arranged to permit the grip to be engaged around the tyre, and releasable fastening means having parts carried by two of said members and arranged to permit the grip to be attached to and removed from a tyre, the connections between the grip members being such that when the grip is engaged upon a tyred wheel, displacement of any of the grip members due for example, to flexing of the tyre as the wheel rotates, can produce a self-tightening effect causing other of said members to be pressed into gripping relation with the tyre.

The link connections may be arranged between the arms on one side only of the grip members, or alternatively, similar link connections may be provided on both sides thereof.

For a better understanding of the invention, alternative embodiments thereof will now be described, by way of example, with reference to the accompanying drawings, in which:

Figure 1 is a side elevation according to one embodiment,

Figure 2 is a cross-section taken along the line II—II of Figure 1,

Figure 3 is a side elevation according to a second embodiment, and

Figure 4 is a cross-section taken along the line IV—IV of Figure 3.

In the embodiment of Figures 1 and 2, the grip device, which is shown in full lines as attached to a pneumatic-tyred driving wheel of an agricultural tractor, comprises a plurality of substantially U-shaped grip elements or members indicated generally at 1, each grip member having a cleat part 2 formed of angle iron and each having arms 3, 4 constituting lever members formed of flat strips of mild steel secured, as by welding, to the opposite end portions of the cleat part. As shown in Figure 1, the angle-iron cleat is arranged to provide a web extending in a plane substantially parallel to the length of the associated lever members 3, 4 and the other web of the angle-iron forms a flat bar extending in a plane at right angles to the length of said lever members. The several grip members are displaceably connected one to another by links 5, and between two of said grip members there are provided links, 5a, 5b and 5c forming part of a fastening device indicated generally at 6, which can be engaged and disengaged to permit the grip to be applied to and removed from the wheel. A similar linkage and fastening means is provided on each side of the grip and, as shown in Figure 1, one end of each link 5 is pivotally connected by a pivot pin 7 to the extremity of one arm 3 (4) while the opposite end of the link is connected to the next adjacent arm 3 (4) by a pivot pin 8 located intermediate the ends of the adjacent arm. The distance between the axes of the pivot pins 7 and 8 in each arm 3 (4) is preferably about one-third of the length of the arm.

When the fastening means on opposite sides of the grip are released, the device can be laid out in a developed form substantially as shown by chain-lines in Figure 1, the links 5a and 5b of each fastening means being disposed at one end of the grip while the co-operating link 5c is disposed at the opposite end thereof. The link 5a of each fastening means is arranged between pivot pins 7 and 8 in a manner similar to that of links 5, while link 5b is pivoted about a pin 7a to the endmost arm 3 (4), but is free at its opposite end so as to form a lever arm adapted to fulcrum about the pin 7a, in the manner hereinafter described. Adjacent its pivot pin 7, link 5a carries a bracket 9 formed of mild steel strip and having an inwardly bent over part 10 forming a loop adapted to hold the free end of the link, or lever arm, 5b in the operative position shown in Figure 1. The bracket 9 is secured to the link 5a by a rivet or bolt 11. The link 5c of each fastening means is connected by a pivot pin 8 to the grip member at the opposite end of the device and is formed with longitudinally spaced holes 12 one of which, when the device is positioned upon the wheel is engaged over a pin 13 carried by and projecting laterally outwardly from the link 5b.

The grip may conveniently be applied to the wheel, by laying the device out along the ground, in alignment with the wheel, substantially as shown by chain-lines in Figure 1. The wheel is then rolled over the cleats 2 so that the two ends of the device can be pulled over the tyre, and the fastening means on each side of the tyre engaged. The fastening may be effected by swinging the lever arm 5b over toward the member carrying the adjacent link 5c, and the pin 13 on arm 5b is engaged in the appropriate hole 12 of link 5c, so that when the arm 5b is swung back and its free end engaged in the loop of bracket 9 the end members of the grip are pulled towards each other to cause, through the link connections, all of the grip members to be urged into firm engagement with the tread of the tyre. By providing a number of holes 12, adjustment may be made to compensate for differences in diameter of the tyre due, for example, to wear.

In the engaged position, the grip members straddle the tyre, each cleat 2 extending across the tyre substantially normal to the plane of the wheel, while the arms 3, 4 extend partly across the opposite side walls of the tyre, the arms being inclined lagwise with respect to the normal forward direction of rotation of the wheel. Thus, as the wheel rotates, the arms of each cleat will, as the cleat comes into contact with the ground, extend at an angle upwardly and forwardly in the direction of travel over the ground, and the web of the cleat parallel to said arms will be similarly upwardly and forwardly inclined. As the said web grips or digs into the ground, any slight slipping movement between the tyre and cleat will tend to displace the arms of the cleat into a position normal to the ground and thus radially of the wheel, this displacement being transmitted through the links 5 to the other cleats and causing the latter to tighten around the wheel and firmly grip the tyre. Slipping of the grip members is thereby prevented and the web of each cleat parallel to the associated arms will be located substantially normal to the ground and thus at the most advantageous angle for biting into and gripping the soil. Upon continued rotation of the wheel, the cleat under consideration moves out of the soil and, upon release of the tension, the cleat together with its arms snaps into the original inclined position and at the same time flinging away any mud or soil which may have collected thereon. The next succeeding cleat then comes into contact with the ground and a repetition of the self-tightening action as already described takes place. Thus, the arrangement is such that any angular displacement of the grip members as they engage the ground, due to flexing of the tyre as the wheel rotates, will cause a corresponding movement of the connecting links tending to press the cleats of the adjacent grip members into closer engagement with the tyre, so that there is produced a self-tightening effect holding the device upon the tyre and preventing the wheel spinning relatively to the grip members. In Figure 1, the grip members are shown in position upon the tyre for a normal forward rolling motion of the wheel in the direction of arrow A.

The alternative arrangement illustrated in Figures 3 and 4 is intended more particularly for use upon small diameter wheels, such as are fitted to light agricultural implements where there may be little clearance between the top of the wheels and the body of the implement, or between the wheels and the chassis. This grip device comprises a series of generally U-shaped grip members 14 formed of strip steel bent to define a cleat or tread part 15 having at one end a short arm 16 adapted to be located on the inboard side of the wheel tyre, and having at the other end a longer arm 17 constituting a lever member and adapted to be located on the outboard side of the tyre. The grip members are displaceably connected together by links 18 arranged in a manner similar to the links 5 of Figure 1. The arm 17 has on its outer face a projection or strake part 19 which forms a web parallel to the length of the associated lever member 17 and adapted to act in a manner similar to that of the corresponding web of the angle-iron cleat of Figure 1. The part 19 is thus adapted to co-operate with part 15 in preventing or minimizing slipping of the wheel when the implement is being used on a soft surface, such as ploughed ground.

This alternative grip can be applied to the wheel in the manner described with reference to Figure 1, and since the grip is for use with relatively small wheels, the fastening is effected by bolting together the flanged ends 20 of two link parts 18a pivoted to the arms 17 at opposite ends of the grip. If desired, however, fastening means of the kind shown at 6 in Figure 1, could be employed. The link connections between the members 14 provide, during rotation of the wheel, a self-tightening effect as already described. The grip of Figure 3 is shown as applied to the type for a normal forward rolling motion of the wheel in the direction indicated by arrow B.

In the described embodiments, the pivotal connections of the various links are illustrated as consisting of rivet pins freely engaged in aligned holes formed in the adjacent parts. Alternatively, the pivots may consist of bolts fitted with self-locking nuts. Moreover, the grip members may be so arranged that when engaged upon a tyre, the cleat or tread parts thereof will extend diagonally across the tyre.

I claim:
1. A wheel grip comprising a number of grip elements each including a transverse tyre-tread engaging part, side arms connected to opposite end portions of, and extending at an angle to, said tyre-tread engaging part, the side arms on one side at least of the several grip elements each constituting a lever member, and a ground-engaging web on each grip element extending in a plane substantially parallel to the length of the associated lever member, and further comprising link and pivot means for pivotally connecting adjacent grip elements and permitting a self-tightening movement of said elements onto a tyre upon displacement of the lever member of one of said grip elements relatively to the tyre, and fastening means associated with said link and pivot means for engaging the grip around a wheel-tyre, with the lever members and the associated webs inclined lagwise relatively to the normal direction of rotation of the wheel tyre, said link and pivot means comprising a first pivot at the end of the lever member of each grip element remote from the associated tyre-tread engaging part, a second pivot on said lever member and located between said first pivot and said associated tyre-tread engaging part, and a rigid link having one end pivotally mounted on the first pivot of one grip element and the other end pivotally mounted on the second pivot of the next adjacent grip element.

2. A wheel grip comprising a number of grip elements each including a transverse tyre-tread engaging part, side arms connected to opposite end portions of, and extending at an angle to, said tyre-tread engaging part, the side arms on one side at least of the several grip elements each constituting a lever member, and a ground-engaging web on each grip element extending in a plane substantially parallel to the length of the associated lever member and substantially at right-angles to said tyre-tread engaging part, and further comprising link and pivot means for pivotally connecting adjacent grip elements and permitting a self-tightening movement of said elements onto a tyre upon angular displacement of the lever member of one of said grip elements relatively to the tyre, and fastening means associated with said link and pivot means for engaging the grip around a wheel-tyre with the free end portion of the lever member of each grip element inclined lagwise relatively to the normal direction of rotation of the wheel tyre, so that, as each grip element engages the ground, the lever arm and web thereof will be inclined upwardly and forwardly in the direction of travel over the ground, said link and pivot means comprising a first pivot at the free end of the lever member of each grip element, a second pivot in said lever member between said first pivot and the associated tyre-tread engaging part, said second pivot being located nearer to said first pivot than to said associated tyre-tread engaging part, and a rigid link having one end pivotally mounted on the first pivot of one grip element, and the other end pivotally mounted on the second pivot of the next adjacent grip element.

3. A wheel grip as claimed in claim 2, wherein each tyre-tread engaging part is formed of angle iron, one web of the angle-iron constituting said ground-engaging web parallel to the associated lever member, and the other web of the angle-iron, when the grip is engaged on the tyre, extending across the thread of said tyre.

4. A wheel grip as claimed in claim 2, wherein each grip element is formed of strip metal and has side arms constituted by bent over portions at opposite ends of and integral with the strip metal tyre-tread engaging part.

5. A wheel grip as claimed in claim 2, wherein the ground-engaging web is constituted by a projecting strake part carried by the associated lever arm and engageable with the ground.

6. A wheel grip as claimed in claim 2, wherein the fastening means comprises a fastening lever pivoted at one end upon the first pivot of the lever member of the grip element disposed at one extremity of the grip, a bracket carried by a link extending between the second pivot of said last-mentioned grip element and the first pivot of the next adjacent grip element, an apertured link freely pivoted to the second pivot of the grip element at the opposite extremity of the grip, pin means for releasably connecting an intermediate part of said fastening lever to said apertured link for tightening the grip elements onto the tyre by rotation of said fastening lever, said fastening lever being maintained in the tightened position by engagement with said bracket.

References Cited in the file of this patent

UNITED STATES PATENTS

| | | |
|---|---|---|
| 1,213,131 | Penseyres | Jan. 16, 1917 |
| 1,867,773 | Spidla | July 19, 1932 |
| 2,553,712 | Jensen | May 22, 1951 |

FOREIGN PATENTS

| | | |
|---|---|---|
| 140,626 | Australia | Apr. 4, 1951 |
| 488,562 | Germany | Dec. 30, 1929 |
| 490,126 | Canada | Feb. 2, 1953 |